July 20, 1937.          J. L. ANDERSON                 2,087,274
                    SPIRAL PIPE WELDING MACHINE
                      Filed April 26, 1933          5 Sheets-Sheet 4
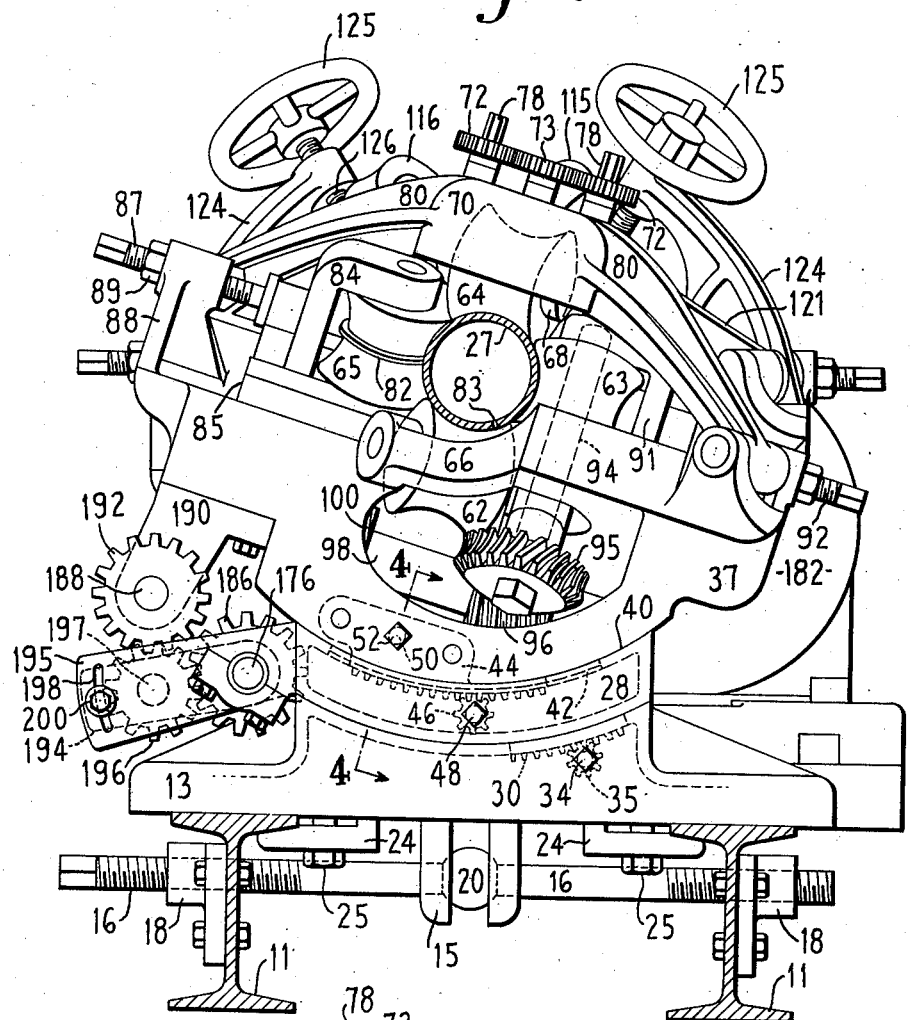
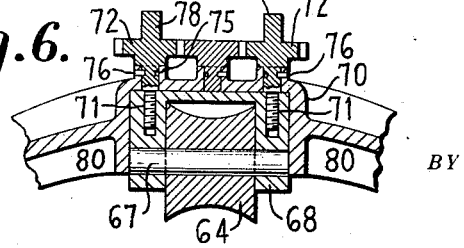

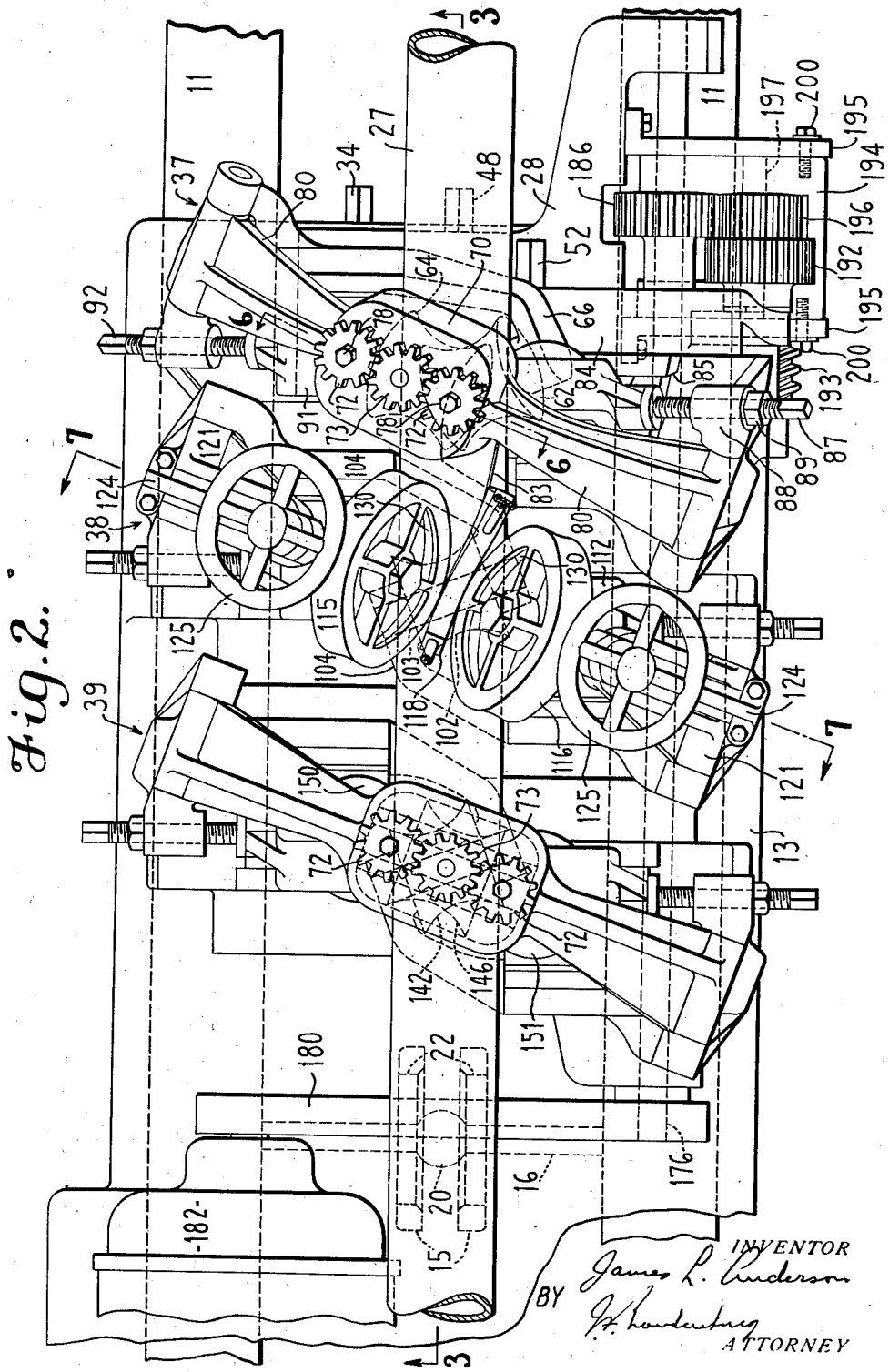

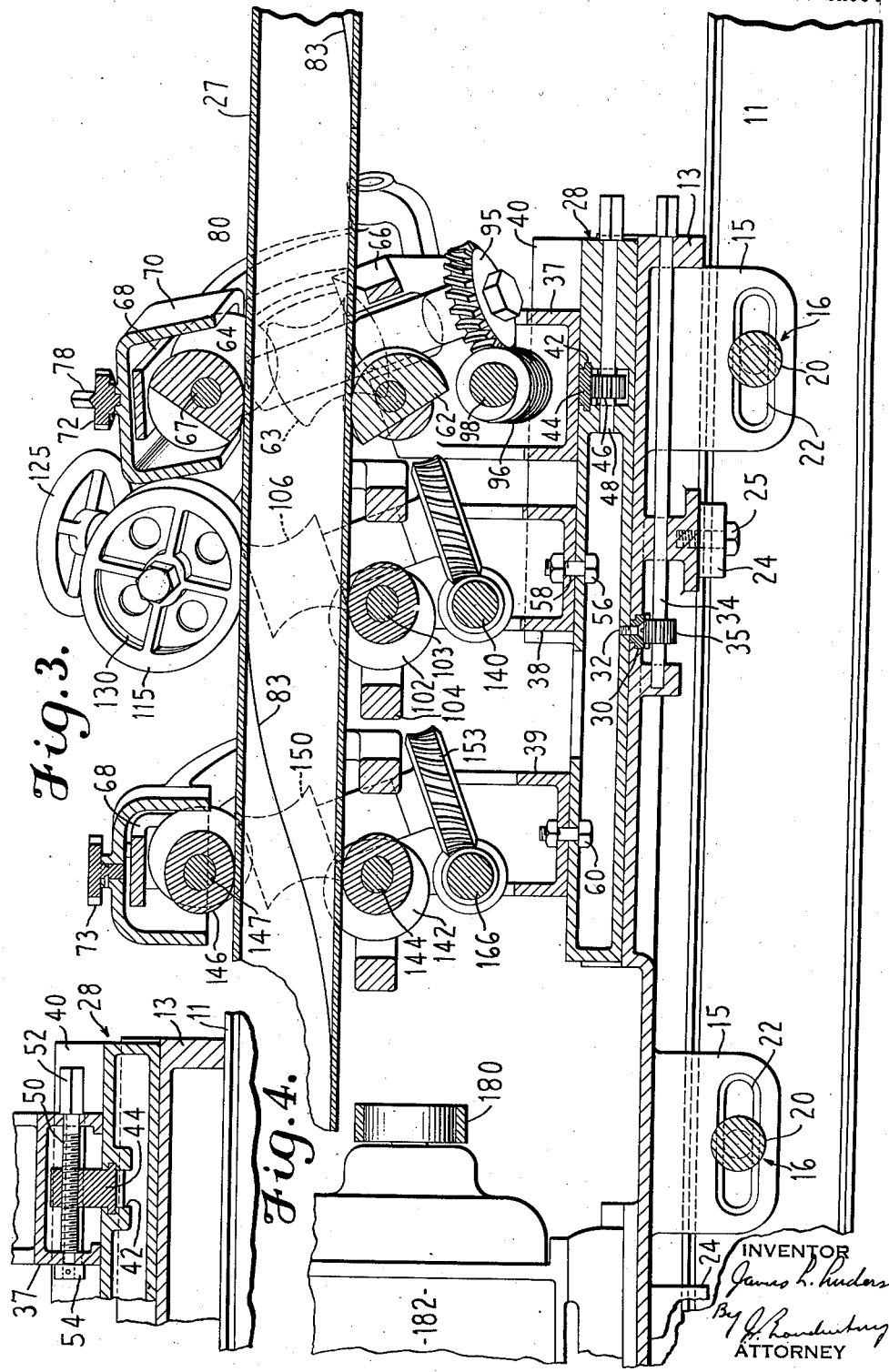

July 20, 1937.  J. L. ANDERSON  2,087,274
SPIRAL PIPE WELDING MACHINE
Filed April 26, 1933  5 Sheets-Sheet 5

INVENTOR
James L. Anderson
BY
ATTORNEY

Patented July 20, 1937

2,087,274

UNITED STATES PATENT OFFICE 2,087,274

SPIRAL PIPE WELDING MACHINE

James L. Anderson, Closter, N. J., assignor to Air Reduction Company, Incorporated, New York, N. Y., a corporation of New York Application April 26, 1933, Serial No. 668,007

21 Claims. (Cl. 113—59)

This invention relates to spiral pipe welding.

Spiral pipe manufacture is usually carried on by means of a spiral forming or wrapping machine to which is attached a welding means generally located at the point where the formed helix adjoins the edge of the unformed sheet.

When all conditions are favorable, such mechanism produces satisfactory results, but variations in the width, straightness, thickness, and temper of the sheet metal, and slippage of the sheet, make it almost impossible in practice to obtain welds of the required perfection.

An object of this invention is to provide a spiral pipe welding machine, separate from the spiral forming means, capable of working in conjunction with a conventional spiral forming or wrapping machine, or taking cut-to-length unwelded spirals, and welding together the edges of the spiral seam with a uniformly perfect weld. Another object is to operate such a welding machine by power mechanism which can be controlled to coordinate the speed of the welding machine with the speed of the spiral forming machine, or the delivery speed of the feeding device when welding cut-to-length spirals.

The invention comprises one or more stands having supports which can be moved to aline the stands with a pipe as it comes from a spiral forming machine or spiral feeding device. The pipe passes through the stands, which position the seam and hold the edges in proper relation for welding. In the illustrated embodiment of the invention, the seam is fusion welded by an oxy-fuel gas welding torch, but the invention can be used with any other suitable thermal welding device.

Each stand has rollers contacting with the pipe at spaced points around the circumference of the pipe. These rollers guide the pipe and control its diameter and the spacing of the seam edges. Other types of guides in the stands can be substituted for the rollers, but the rollers have the advantage of producing substantially no friction, and some of the rollers are rotated by power to feed the pipe through the stands.

Other objects, features and advantages of the invention will appear or be pointed out as the description proceeds.

In the accompanying drawings, forming part hereof:

Fig. 2 is a top plan view of the welding machine shown in Fig. 1;

Fig. 3 is a sectional view taken on the line 3—3 of Fig. 2;

Fig. 4 is a detail sectional view taken on the line 4—4 of Fig. 5;

Fig. 5 is an end elevation of the machine shown in the preceding figures, this view showing the right-hand end of the machine shown in Figs. 1 and 2;

Fig. 6 is a fragmentary sectional view on the line 6—6 of Fig. 2; and

Figure 1:
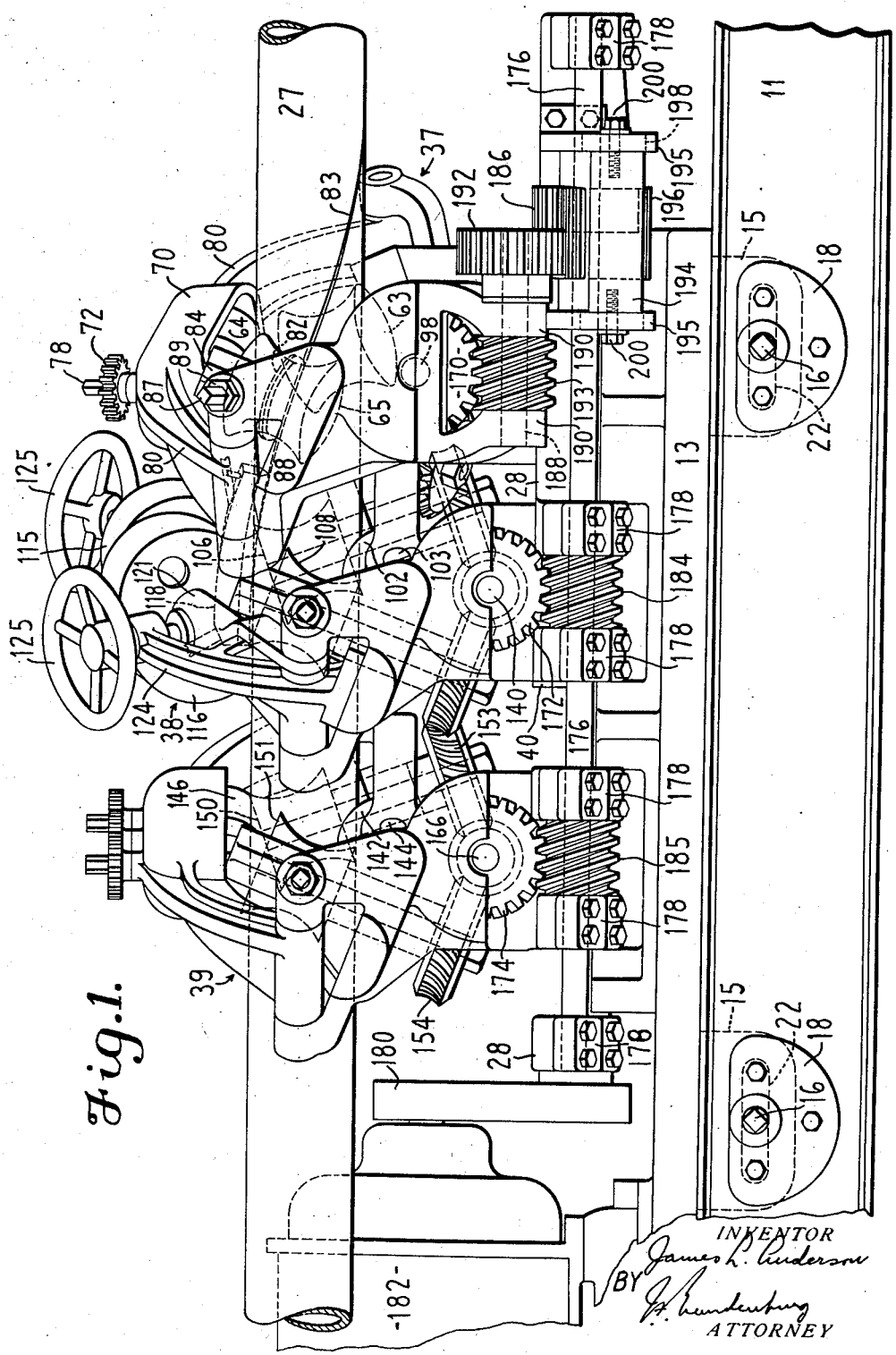
Fig. 1 is a side elevation of a spiral pipe welding machine embodying the invention.

The welding machine has a fixed base 11 which comprises two parallel I-beams. When the invention is used with a spiral forming or wrapping machine, the same base 11 can be extended under both machines.

A sub-frame 13 rests on the base 11 and has yokes 15 extending downward between the I-beams. Adjustment screws 16 are threaded through blocks 18, as shown in Fig. 5. The blocks are bolted to the I-beams of the base.

Each yoke 15 straddles a spherical collar 20 on the adjustment screw 16. The adjustment screw extends through slots 22 (Fig. 3) in the yoke.

Clamps 24 extend under the top flanges of the I-beams, as shown in Fig. 5, and screws 25 thread into the sub-frame 13 and draw the clamps against the flanges to hold the sub-frame immovable on the base 11. When the screws are loosened and the clamps 24 released, the sub-frame 13 can be moved by turning the adjustment screws 16. The direction of rotation of the screws 16 determines the direction of movement of the sub-frame. The two adjustment screws 16 are at widely spaced locations along the base, as shown in Fig. 1. The sub-frame 13 can be moved into parallel positions by turning both of the screws 16 the same amount, or the sub-frame can be moved into oblique positions with respect to the base 11 by turning one screw only, or by turning both screws different amounts or in opposite directions. Limited longitudinal movement of the sub-frame on the base does not interfere with the operation of the adjustment screws 16 because these screws extend through slots 22 in the yokes 15. The construction described permits universal movement of the sub-frame in the plane of the base, for alining the welding machine with a spiral forming or wrapping machine.

The top surface of the sub-frame 13 is a cylindrical bearing surface (Fig. 7), with its axis substantially coincident with the axis of the pipe 27. A frame 28 has a bearing surface on its bottom side curved to fit the cylindrical bearing surface on the top of the sub-frame 13.

A gear segment 30, shown in Figs. 3 and 5, is connected to the bottom face of the frame 28 by screws 32. The gear segment 30 is of T-section and fits into an undercut slot in the sub-frame 13. The gear segment is freely slidable in this undercut slot, but prevents the frame 28 from being lifted from the sub-frame, and also prevents longitudinal movement of the frame with respect to the sub-frame.

A shaft 34 is supported in bearings in the sub-frame 13. A pinion 35 is fixed on the shaft 34 and meshes with the gear segment 30. The shaft 34 extends beyond the sub-frame, and the end of the shaft is shaped to receive a handle or tool for turning the shaft.

Three stands 37, 38, and 39 are supported by the frame 28. The pipe 27 passes first through the stand 37, from which it is fed to welding apparatus carried by the stand 38. The pipe passes from the welding stand 38 to the delivery stand 39, which supports the pipe beyond the welding stand and is furnished with power-driven rolls to help move the pipe through the welding machine. The delivery stand 39 can be omitted, if other means are provided for supporting the pipe after it passes through the welding stand.

The top face of the frame 28 under the feed stand 37 and welding stand 38 is a cylindrical bearing surface 40 having an axis substantially coincident with the axis of the pipe 27. The bottom faces of the stands 37 and 38 fit this cylindrical bearing surface so that movement of these stands on the frame 28 is a rocking movement about the pipe axis.

The feed stand is movable longitudinally on the frame 28, in addition to its rocking movement. A slot 42 in the frame 28 has undercut side walls, and a gear segment 44 is slidable in the slot but held against displacement up or down by projecting sides fitting into the grooves of the undercut side walls of the slot. A pinion 46 is fixed to a shaft 48 which turns in bearings in the frame 28 and has one end extending from the end of the frame for receiving a handle or tool to rotate the pinion 46. When this pinion is rotated it moves the gear segment 44 to rock the feed stand about the axis of the pipe.

The connection of the gear segment 44 to the feed stand 37, and the means for moving the feed stand longitudinally are shown in Fig. 4. An upstanding portion of the back of the gear segment 44 is threaded to receive a screw 50. This screw is rotatably supported in bearings in the feed stand 37 and held against longitudinal movement in the stand by an enlarged portion 52 at one end and a collar 54 pinned to the other end. The enlarged portion is shaped to fit a handle or tool by which the screw 50 is turned. Since the gear segment 44 is held against movement longitudinally of the frame, rotation of the screw 50 causes the feed stand 37 to be moved longitudinally.

A bolt 56 passes through a slot 58 (Fig. 7) in the stand 38 and fastens the stand to the frame 28. The slot 58 permits a limited movement of the stand 38 on the frame 28 for adjusting the relative position of the stand when the machine is first set up and before the bolt 56 is tightened. After the welding stand 38 is properly positioned on the frame, it is permanently fastened in place by the bolt 56, and all necessary adjustments of the position of the welding stand are effected by movement of the frame 28.

Referring again to Fig. 3, the delivery stand 39 is shown connected to the frame 28 by a bolt 60. This stand is immovable on the frame 28, but for purposes of manufacture and shipment the stand is made as a separate unit to be fastened to the frame when the machine is set up.

The feed stand 37 has four rolls through which the pipe 27 passes. These rolls are preferably grooved and are shown in Fig. 5 located substantially 90 degrees apart around the circumference of the pipe. The axes of the rolls are set obliquely with respect to the axis of the pipe so that the face of each roll moves in the same direction as the surface of the pipe at its point of contact with the roll.

The rolls of the feed stand include a bottom roll 62, a side roll 63, a top roll 64, and a fin roll 65. The bottom roll 62 is rotatably supported by an arm 66, which is fixed to the stand 37. The other rolls 63, 64 and 65 are movable toward and from the pipe axis to control the pressure of the rolls against the pipe and to adjust the machine within a limited range for different diameters of pipe.

The top roll 64 has an axle 67 (Fig. 6) extending into a block 68 which is movable up and down in a housing 70 by screws 71 threading into the block. There are two of these screws, one on each side of the block, and they are caused to turn together in the same direction by gears 72, one on the upper end of each screw 71, and an idler gear 73 meshing with both of the gears 72 for transmitting motion of either to the other. The upper unthreaded portion of each screw 71 runs in a bearing in the top wall of the housing 70, and has a circumferential groove 75 into which a pin 76 extends to prevent axial movement of the screw 71 and associated gear 72. A stem 78 projecting from the top of each gear 72 is shaped to receive a handle or tool for turning the gear. The housing 70 is supported by arms 80, which connect with the lower portion of the stand 37.

The fin roll 65 has a fin 82 which runs in the seam 83 of the pipe 27 and serves as a seam guide and a spacer for holding the edges of the seam apart. The fin roll is rotatably supported by a carriage 84, which is slidable in a dovetail guideway 85 to move the fin roll toward or from the pipe 27. One side of this guideway is shown in perspective in Fig. 2.

The carriage 84 is moved toward the pipe 27 by a screw 87, which threads through a bracket 88 extending up from the lower portion of the stand 37. A lock-nut 89 holds the screw 87 in any set position.

Referring again to Fig. 5, the side roll 63 is rotatably supported by a carriage 91, which is similar to the carriage 84 and is moved toward the pipe 27 by a screw 92. The side roll 63 is fixed on a shaft 94, which rotates in bearings in the carriage 91 and extends downward below the carriage. A worm-wheel 95 is secured to the lower end of the shaft 94. This worm-wheel is driven by a worm gear 96 secured to a cross-shaft 98. This shaft is power driven and its motion is transmitted to the side roll 63. The fin roll 65 is also power driven by a shaft and worm-wheel similar to those already described for the side roll 63, and driven by a worm gear 100 on the cross-shaft 98. Similar worm drive mechanisms for rotating the side rolls of the welding stand 38 and delivery stand 39 are shown in Fig. 1.

Figure 7:
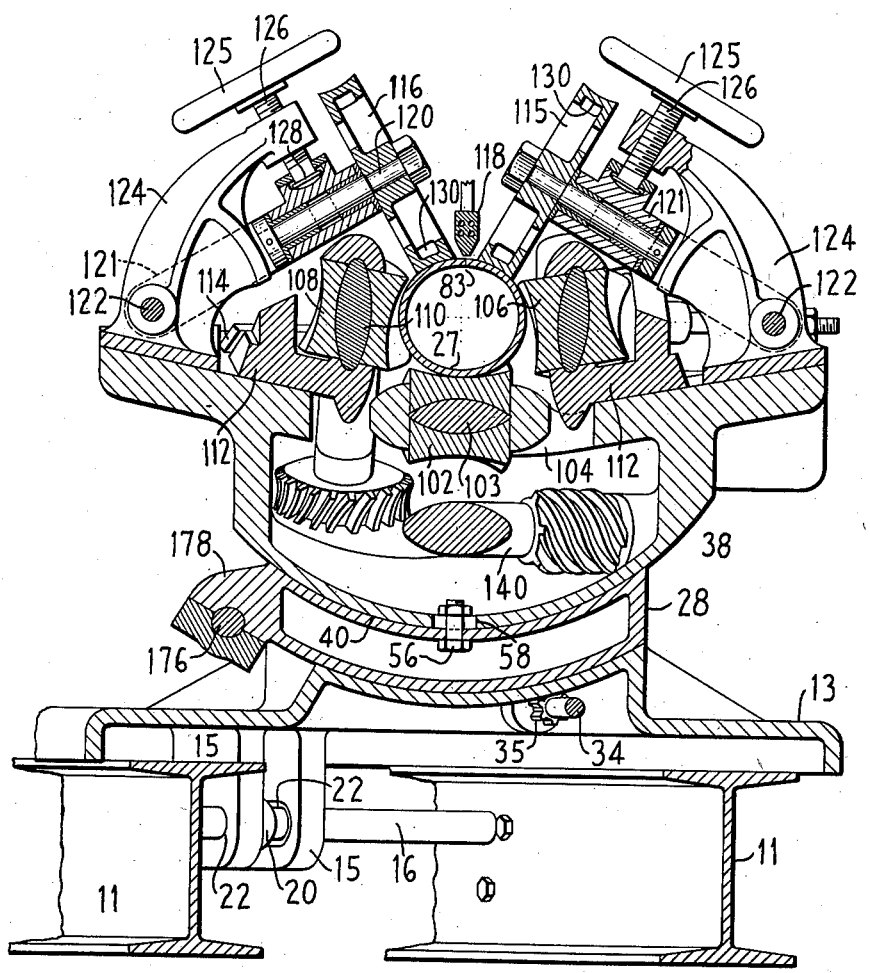
Fig. 7 is a sectional view on the line 7—7 of Fig. 2.

The welding stand 38 is shown in detail in Fig. 7. Certain of the shafts and rolls extend obliquely to the plane of the section and are therefore distorted, circular sections appearing as ellipses. The pipe 27 is supported in the welding stand by a roll 102, which has an axle 103 supported by an arm 104 extending from the lower portion of the stand 38. This construction is the same as that described for the roll 62 of the feed stand.

Side rolls 106 and 108 of the welding stand 38 correspond to the side rolls 63 and 65 of the feed stand, and except for the absence of the fin 82 are similar in their construction and connection to the stand. For example, the side roll 108 is secured to a shaft 110 which runs in bearings in a carriage 112, and this carriage slides in a dove-tail groove 114.

Two welding rolls 115 and 116 contact with the pipe on opposite sides of the seam close to the seam. These rolls are termed "welding rolls" because of their proximity to the weld. The fin 82 of the seam guide means separates the edges of the seam and determines the cleft width at the feed stand. The welding rolls are adjusted so that the seam cleft becomes narrower as it approaches the welding rolls.

The welding rolls 115 and 116 are disposed in planes at an acute angle to each other so that there is space between the welding rolls for a welding torch 118 or other source of welding heat. The torch is shaped to follow the spiral of the seam, as shown in Figs. 1 and 2. Such a torch is the subject-matter of my copending application Serial No. 495,920, filed November 15, 1930, now Patent No. 1,964,307, dated June 26, 1934. The torch is supported by the welding stand, or in any other suitable way.

The welding roll 116 has an axle 120 supported by an arm 121 which has a pivotal connection 122 to the stand 38. A fixed arm 124 is rigidly connected with the lower portion of the stand 38. This arm extends above the arm 121. A hand-wheel 125 has a stem 126 which threads through the arm 124 and connects with the arm 121 by a ball and socket type connection 128. The hand-wheel 125 is turned one way to move the welding roll 116 toward the pipe axis or increase the pressure of the roll against the pipe. Turning the hand-wheel 125 the other way moves the welding roll away from the pipe or decreases the pressure against the pipe 27. The welding roll 115 is supported by structure similar to that described for the welding roll 116.

Each of the welding rolls has a channel 130 which runs around the entire circumference of the rims of the rolls and through the spokes of the welding rolls. Water is placed in the lower portion of each channel for cooling the welding rolls when the machine is in operation.

The side rolls 106 and 108 are power driven from a common drive shaft 140, which is operatively connected to the side roll shafts by worm gearing similar to the driving mechanism for the feed rolls 63 and 65 of the feed stand 37.

The delivery stand 39 has four rolls corresponding to the rolls of the feed stand, with the fin omitted. A bottom roll 142 (Fig. 3) is carried by an axle 144, which is supported by a fixed arm of the delivery stand. A top roll 146 has an axle 147 which is movable toward and from the pipe axis by mechanism similar to that described for changing the position of the top roll 64 of the feed stand 37.

Side rolls 150 and 151 (Fig. 1) are supported by the delivery stand 39 on carriages similar to those supporting the side rolls 63 and 65 of the feed stand 37 and with similar screw means for moving the side rolls toward the pipe. The mechanism for driving the side rolls 150 and 151 is also similar to that used to drive the side rolls 63 and 65 of the feed stand. Worm-wheels 153 and 154, secured to the shafts of the side rolls 150 and 151, respectively, engage worm gears on a common drive shaft 166. Fig. 3 shows a sectional view through the power driving connections for the side rolls in all of the stands. The driving mechanism of the feed stand 37 and that of the other stands appear different in this view because the feed stand is in a different position about the axis of the pipe and the section plane therefore cuts the driving mechanism of the feed stand obliquely. Actually, all of the driving mechanisms shown in this view are the same.

Referring again to Fig. 1, the transverse drive shaft 98 has a worm wheel 170 secured to one end. The transverse drive shafts 140 and 166 have worm-wheels 172 and 174, respectively, secured to corresponding ends and similar to the worm-wheel 170. The worm-wheel 170 is shown higher than the worm-wheels 172 and 174, because the feed stand 37 is rocked about the pipe axis so that the drive shaft 98 slopes upwardly toward the near side of the machine.

A longitudinal drive shaft 176 is rotatably supported in bearings 178 carried by the frame 28, and is rotated by a belt 180 which is driven from a variable speed electric motor 182.

Worm gears 184 and 185 are secured to the longitudinal drive shaft 176 in positions to engage the worm wheels 172 and 174, respectively. A gear 186 is secured to the shaft 176 just beyond the entrance end of the feed stand.

A short drive shaft 188 runs in bearings in arms 190 of the feed stand 37. A gear 192 is connected to one end of the short drive shaft 188, and a worm gear 193 is secured to this drive shaft in position to engage the worm wheel 170.

A yoke 194 is pivotally supported by the drive shaft 176 and extends outward from the drive shaft between two arms 195 of the frame 28. A wide face gear 196 is rotatably supported by the yoke 194 on an axle 197, (Fig. 5), which extends parallel to the shafts 176 and 188. Each of the arms 195 has an arcuate slot 198, with the center of the arc on the axis of the longitudinal drive shaft 176. A screw 200 extends through the slot 198 of each arm 195 and threads into the yoke 194. The yoke can be oscillated about the drive shaft 176 within the angular limits imposed by the length of the slots 198, and the screws 200 can be screwed down to hold the yoke in any position.

The wide face gear 196 meshes with the gear 186 on the drive shaft 176. Movement of the wide face gear 196 with the yoke 194 does not affect the engagement of the gears because the axis of rotation of the yoke is coincident with the axis of the gear 186.

The wide face gear 196 also meshes with the gear 192. Rocking movement of the feed stand 37 about the axis of the pipe 27 changes the position of the gear 192, but the yoke 194 can be moved to keep the gears 196 and 192 in mesh. Thus, the wide face gear 196 and the yoke 194 comprise means in the driving connections to the feed stand for compensating for movement of the feed stand with respect to the frame 28, which carries the longitudinal drive shaft 176. The width of the face of the gear 196 (Fig. 1) is enough greater than the width of the gear 192 so that movement of the feed stand 37 longitudinally of the pipe within the limits of travel imposed by the mechanism of Fig. 4 will not move the gear 192 beyond the end of the wide face gear 196.

In the illustrated embodiment of the invention the side rolls of each stand are power operated, but all of the rolls of a stand can be idler rolls, or the machine can be designed with no power drive for any of the rolls and the pipe moved by means outside of the machine. The invention includes guide means in the stands through which the pipe passes, and for some purposes guides other than rolls can be used.

The operation of the machine is as follows:

The pipe 27 is delivered to the machine direct from a spiral forming or wrapping machine, or is delivered in cut to length, unwelded sections. The welding machine is alined with the forming machine or other pipe supply means by adjusting the position of the sub-frame 13 on the base 11. The pipe passes first through the rolls 62, 63, 64 and 65 (Fig. 5) of the feed stand 37. The fin 82 of the roll 65 extends into the seam cleft 83 and holds the edges of the seam apart. The position of the feed stand 37 is adjusted to bring the fin 82 into register with the seam cleft by turning the screw 50 to move the feed stand longitudinally of the pipe axis and/or turning the shaft 48 to rock the feed stand about the axis of the pipe.

The pipe is fed through the stand 37 to the welding stand 38, where it passes through the rolls 102, 106, 108, 115 and 116 (Fig. 7). The position of the welding stand 38 is adjustable on the frame 28 to locate the stand so that the pipe seam comes midway between the welding rolls 115 and 116. Longitudinal adjustment of the feed stand with respect to the welding stand enables the seam guide fin to operate in the seam cleft and the seam to pass midway between the welding rolls 115 and 116 with different pipes having various pitches to the seam helix. The use of sheet metal of different width produces a pipe seam with a different pitch even though the diameter of the pipe is the same.

In order to have the pipe seam pass midway between the welding rolls, the welding stand must occupy a definite position with respect to the wrapping or forming machine determined by the pitch of the seam helix. The position of the welding stand can be adjusted, without loosening the bolt 56, by operating the shaft 34 and pinion 35 to rock the frame 28 about the axis of the pipe. The welding stand can also be moved longitudinally of the pipe axis toward or from the wrapping or forming machine by sliding the sub-frame 13 on the base 11; the slots 22 in the yoke 15 make such movement possible.

The welding torch 118 fits between the welding rolls 115 and 116 and extends forwardly along the pipe seam as shown in Figs. 1 and 2. The first jets of the torch preheat the seam edges and the later flames fuse the edges and cause them to flow together. It will be understood, however, that the invention is not limited to the precise manner in which the edges are united.

The welded pipe passes through the rolls of the delivery stand 39 (Fig. 3). As the welded seam passes through the delivery stand, its position with respect to the rolls is unimportant and it is therefore not necessary to adjust the position of the delivery stand for pipes having a different pitch to the seam helix.

All of the rolls of each stand, except the bottom rolls, can be adjusted radially toward the pipe axis to control the pressure of the rolls against the pipe and position the rolls for pipes of different diameter. The axis about which the stands rock is not exactly coincident with the pipe axis except for pipe of a given diameter when held accurately centered in the stands by perfect adjustment of the positions of the rolls. However, the axis about which the stands rock is substantially coincident with the pipe axis for all sizes of pipe which the machine is designed to weld.

The invention has been described for making butt welds, but can also be used for making lap weld pipe. Changes and modifications can be made in the structure, and various features of the invention can be used alone or in combination with other features, without departing from the invention as defined in the claims.

I claim:

1. A spiral pipe welding machine comprising a feed stand; a plurality of grooved rolls rotatably supported by the feed stand in positions to contact with the surface of a spirally-wound, unwelded pipe along arcs of substantial length as the pipe passes through the stand; a second stand; a source of welding heat in the second stand; a plurality of rolls rotatably supported by the second stand in position to confine and guide the pipe as it passes under said source of welding heat, the rolls of said second stand including two rolls close to the spiral pipe seam, one on each side of the seam; and means to control the pressure of the two rolls against the pipe.

2. A spiral pipe welding machine comprising concave-face feed rolls forming a circular pass through which the spirally-wound pipe travels; a stand by which the feed rolls are supported; a second stand connected to the first stand, means for moving the second stand with respect to the first stand longitudinally of the pipe axis to change the relative position of the spiral seam in the second stand; a source of welding heat in position to weld the seam as it passes through the second stand; and a plurality of welding rolls rotatably supported by the second stand to confine and guide the pipe as it passes said source of welding heat.

3. A spiral pipe welding machine comprising a feed stand through which the unwelded pipe passes, a seam guide comprising a fin associated with the feed stand and extending through the seam, a second stand beyond the feed stand and through which the spirally-wound pipe passes during the welding operation, means for holding a welding device associated with the second stand, and means connecting the stands and movable to change the spacing between the stands longitudinally of the pipe axis to shift the angular position of the spiral seam with respect to the welding device.

4. A spiral pipe welding machine comprising a first stand; a seam guide carried by the first stand; a second stand through which the spirally-wound pipe passes during the welding operation; a common frame connecting both of the stands; and a bearing, between one of the stands and the frame, said bearing comprising a curved surface having its center of curvature substantially coincident with the axis of the pipe so that the stand can be rocked about the axis of the pipe as a center to adjust the relative angular positions of the stands according to the pitch of the spiral seam.

5. A spiral pipe welding machine comprising a frame; a welding stand carried by the frame, guiding means on the welding stand through which the spirally-wound pipe passes during a welding operation; another stand; a seam guide carried by the latter stand; and cylindrical bearing surfaces between the frame and one of the stands so that the stand can be rocked on the frame, said bearing surfaces having an axis substantially coincident with the axis of the spiral pipe seam.

6. A spiral pipe welding machine comprising a feed stand; a seam guide carried by the feed stand; a welding stand through which the spirally-wound pipe passes during the welding operation; a frame; and means connecting the stands to the frame and movable to change the spacing of the stands longitudinally of the pipe axis and to rock one stand relative to the other about an axis substantially coincident with the pipe axis so that the relative positions of the stands can be set in accordance with the pitch of the spiral seam.

7. In a machine for welding spiral seam pipe, a feed stand; a fin carried by the feed stand for guiding and separating the edges of the spiral seam; a welding stand through which the pipe passes after leaving the feed stand; rolls carried by the welding stand and spaced from the fin lengthwise of the pipe axis, said rolls being angularly disposed with respect to the fin in position to contact with the outside surface of the unwelded pipe on opposite sides of the spiral seam to control the relation of the seam edges; and means for changing the pressure of the rolls against the surface of the pipe.

8. In a machine for welding spiral seam pipe, a feed stand and a welding stand through which the spirally-wound metal passes; a common frame connected to the stands, with one stand angularly movable on the frame relative to the other stand; and a sub-frame on which said common frame is angularly movable to change the positions of both stands as a unit.

9. In a machine for welding spiral seam pipe, a feed stand and a welding stand through which the spirally-wound pipe passes; a common frame; means connecting one of the stands to the frame for angular adjustment on the frame about an axis substantially coincident with the axis of the spirally seamed pipe; and means connecting the other stand to the frame for movement with respect to the frame longitudinally of the axis of the spirally seamed pipe and for rocking movement on the frame about an axis substantially coincident with the axis of the pipe.

10. A spiral pipe welding machine including in combination a base, a frame resting on the base, plane bearing surfaces supporting the frame on the base so that said frame is shiftable on the base with universal movement in a plane, means for holding the frame in set position on the base including devices operable to shift the frame on the base for positioning the frame with respect to a spiral forming mill, a feed stand and a welding stand through which the spirally-wound pipe passes, and bearing surfaces supporting said stands from the frame, said surfaces being movable to adjust the stands on the frame with respect to one another in accordance with the pitch of the spiral seam.

11. A spiral pipe welding machine including in combination a feed stand and a welding stand through which the spirally-wound pipe passes; a common frame to which said stands are connected and on which one of the stands is movable with respect to the other to adjust the relative positions of the stands in accordance with the pitch of the spiral seam; a sub-frame on which said common frame is supported and movable to change the positions of both of the stands as a unit; and a base on which the sub-frame is supported and movable in a plane parallel to the axis of the pipe.

12. A spiral pipe welding machine comprising a feed stand; a plurality of feed rolls supported by the feed stand in position to contact with and confine an unsealed and unwelded spirally-wound form at several spaced points around its circumference, said rolls having concave faces and forming a roll pass with a contour similar to the desired shape of the spirally-wound pipe; a welding stand; a plurality of rolls supported by the welding stand including rolls in position to contact with a pipe on both sides of the spiral seam and close to the seam to control the spacing of the seam edges; and a delivery stand having a plurality of rolls through which the pipe passes and in which the pipe is supported after leaving the welding stand.

13. A spiral pipe welding machine comprising a feed stand; a welding stand; a delivery stand; a common frame on which all of the stands are supported in position for a spirally-wound pipe to pass successively through them; a rigid connection between one of said stands and the frame; and means connecting the other two stands with the frame including bearings on which said other stands are movable with respect to the frame and to each other to position them in accordance with the pitch of the spiral pipe seam.

14. A spiral pipe welding machine comprising a feed stand; a welding stand; a delivery stand; a common frame on which all of the stands are supported in position for a spirally-wound pipe to pass successively through them; means rigidly connecting one of the stands to the frame; means connecting at least one of the stands to the frame including a bearing on which the stand is movable with respect to the frame and the rigidly connected stand to set the relative positions of the stands in accordance with the pitch of the spiral seam; and a sub-frame on which the frame is supported and movable to change the positions of the stands as a unit.

15. A spiral pipe welding machine comprising a feed stand; a welding stand; a delivery stand; a common frame on which all of the stands are supported in position for a spirally-wound pipe to pass successively through them; means rigidly connecting one of the stands to the frame; means connecting at least one of the stands to the frame for movement with respect to the frame; and a sub-frame supporting the frame, said frame being movable on the sub-frame about an axis substantially coincident with the axis of the spiral pipe seam; and a base on which the sub-frame is supported and universally adjustable in a plane parallel to the axis of the pipe.

16. In a spiral pipe welding machine, a welding stand through which a spirally-wound pipe passes during the welding operation; a plurality of rolls supported by the stand for rotation in the direction of spiral movement, said rolls including at least one roll in position to support the pipe in the stand, a welding device, and two welding rolls for holding the seam edges together, said welding rolls being in position to contact with the outside of the pipe on opposite sides of the welding device and close to the seam; and means for changing the pressure of the welding rolls against the pipe.

17. In a spiral pipe welding machine, a frame; a stand supported by the frame and movable with respect to the frame to adjust the position of the frame in accordance with the pitch of the spiral seam; a plurality of rolls carried by the stand in positions to contact with a spirally-wound pipe at spaced points around its circumference; power means for rotating two of said rolls on opposite sides of the pipe in opposite directions to drive the spiral pipe through the stand, said power means including a drive shaft carried by the frame, another drive shaft carried by the stand, driving connections between the shafts including means for compensating for movement of the stand with respect to the frame.

18. The combination of a welding stand through which a pipe passes during a welding operation; rolls carried by the stand in positions to contact with the pipe at spaced points around its circumference, said rolls including a roll under the pipe for supporting it as it passes through the welding stand, and two welding rolls contacting with the pipe on opposite sides of the seam close to the seam, said welding rolls being spaced from one another and disposed in such positions that their planes of rotation are at an acute angle to one another so that there is space between said welding rolls for a heating agency to weld the pipe seam.

19. The combination of a welding stand through which a pipe passes during a welding operation; rolls carried by the stand in positions to contact with the pipe at spaced points around its circumference, said rolls including a roll under the pipe for supporting it as it passes through the welding stand, two welding rolls contacting with the pipe on opposite sides of the seam close to the seam, said welding rolls being spaced from one another and disposed in such positions that their planes of rotation are at an acute angle to one another so that there is space between said welding rolls for a heating agency to weld the pipe seam; a feed guide comprising a fin extending between and separating the edges of the pipe; and means for regulating the pressure of the welding rolls against the pipe to control the seam cleft width as it passes between said welding rolls.

20. A spiral pipe welding machine comprising a feed stand; a welding stand; a common frame supporting the stands; a plurality of rolls in each stand through which a spirally-wound pipe passes; axles on which said rolls are supported for rotation in the direction of spiral movement; means for adjusting some of said rolls toward the axis of the pipe; and power means for rotating the adjustable rolls to drive the pipe through the stands, said power means including a common drive shaft on the stand operatively connected to the adjustable rolls.

21. In a spiral pipe welding machine, two stands through which the spirally wound pipe advances after having been previously wound to spiral form with the seam edges in substantially abutting relation, feed rolls and a seam guide supported by one of the stands with said rolls in such relation that they form a substantially circular roll pass through which the spirally-wound form passes, the seam guide being in position to extend between the seam edges to guide the seam, welding rolls rotatably supported by the other stand in position to contact with the outside of the pipe on opposite sides of the weld, and means for changing the positions of the feed rolls with respect to the welding rolls in accordance with the pitch of the spiral seam.

JAMES L. ANDERSON.